3,297,521
**FUNGUS CONTROL WITH 4-(PHENYLTHIO-
METHYL)ANILINES**
Philip T. S. Lau, Rochester, and Gerald F. Grillot, Syracuse, N.Y., assignors to Allied Chemical Corporation, New York, N.Y., a corporation of New York
No Drawing. Filed May 22, 1964, Ser. No. 369,594
6 Claims. (Cl. 167—30)

This invention relates to a method and composition for combatting fungus infestations with 4-(phenylthiomethyl) anilines.

It is known that N-(phenylthiomethyl)-aniline compounds can be formed by the condensation of thiophenols and aromatic amines with formaldehyde according to the Mannich reaction.

We have now wound that if the condensation reaction between certain thiophenols, aromatic amines and formaldehyde is carried out by heating the reactants at temperatures of about 80° C. or above, preferably between about 80° C. and about 100° C. in a liquid solvent reaction medium such as ethanol using substantially equimolecular proportions of the reactants and in the presence of a substantially equimolecular proportion of a strong mineral acid such as hydrochloric, hydrobromic or sulfuric acid, there are obtained, instead of the N-substituted derivatives (Mannich bases), high yields of the 4-phenylthiomethyl) anilines. We have also discovered that Mannich bases of the character referred to, can be made to rearrange substantially completely to the 4-(phenylthiomethyl) anilines by heating them in a liquid solvent reaction medium inert to the reactants, at temperatures of about 80° C. or above, preferably from about 80° C. to about 100° C. in the presence of a substantially equimolecular proportion of strong mineral acid.

While the mechanism of the direct condensation reaction in the presence of strong acid, is not entirely clear, it is believed that the Mannich bases are first formed and then rearrange to the 4-(phenylthiomethyl) anilines. The reaction is illustrated by the following equation:

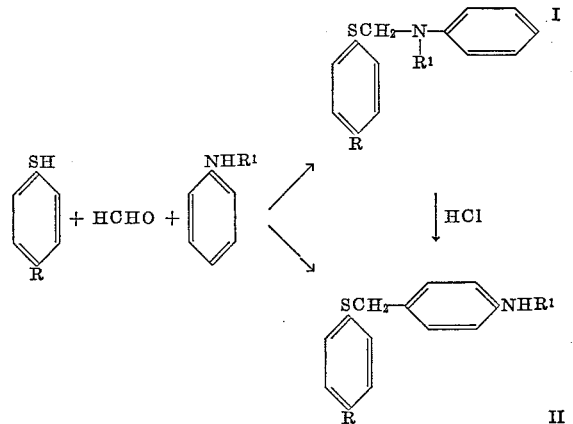

wherein R is a member selected from the group consisting of hydrogen and chlorine, $R^1$ is a member selected from the group consisting of hydrogen and the methyl radical.

General Formula I represents the Mannich bases, i.e., the N-(phenylthiomethyl) anilines.

Formula II represents the 4-(phenylthiomethyl) anilines prepared by the new process of our invention.

Our new process, whether carried out by rearranging the already formed Mannich bases, or by forming the rearranged 4(-phenylthiomethyl) aniline directly, both involve heating a compound of the formula:

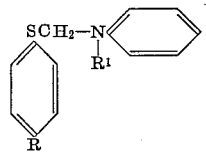

wherein the R substituents are as defined above, in a liquid reaction medium at temperatures preferably between about 80° C. and about 100° C. in the presence of a substantially equimolecular proportion of a strong mineral acid having a dissociation constant of the order of hydrochloric, hydrobromic and sulfuric acids, that is having a ka. of at least about $10^{-2}$.

Suitable solvents for use as the liquid reaction medium include the liquid oxygenated solvents boiling below about 150° C. such as the lower saturated aliphatic alcohols, dioxane and the like.

In the preferred direct method, an aromatic thiol of the formula:

wherein R is hydrogen or chlorine is preferably mixed with an equimolecular proportion of formaldehyde (suitably in aqueous solution) and sufficient amount of inert organic liquid boiling within the reaction temperature limits, to serve as reaction medium, preferably ethanol. Then there is slowly added to the above solution an equimolecular proportion of an aromatic amine of the formula:

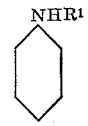

wherein $R^1$ represents hydrogen or the methyl radical, dissolved in a substantially equimolecular proportion of concentrated mineral acid preferably concentrated hydrochloric acid, i.e., of at least about 35% concentration. The mixture is heated at at least about 80° C. preferably at about 80° C. to about 100° C. with stirring, until the reaction is complete, usually within about 15 minutes to about 1 hour. The mixture is then cooled and treated with an alkali such as sodium hydroxide to neutralize the mineral acid whereupon crystals of the 4-(phenylthiomethyl)-aniline separate and are recovered, as by filtration, washing and recrystallization.

In order to obtain high yields of 4-(phenylthiomethyl)-anilines, it is essential to employ a substantially equimolecular proportion of mineral acid in the heating step, whether carried out with the individual primary reactants or using the appropriate Mannich base as starting material. Other proportions of strong mineral acid can be used, but result in lower yields of 4-(phenylthiomethyl) aniline product. When weak acids such as acetic or formic are used, only the normal Mannich bases are obtained, not the 4-(phenylthiomethyl) anilines as indicated in Table I below wherein the numeral III represents 4-(p-chlorophenylthiomethyl)-N-methyl aniline.

TABLE I.—EFFECT OF ACID EQUIVALENT IN CONDENSATION OF p-CHLOROTHIOPHENOL, FORMALDEHYDE AND METHYL ANILINE

| Acid | Acid Equivalent | Time, Min. | Product | Yield, Percent |
|---|---|---|---|---|
| None | | 120 | Mannich base | 72 |
| HCl | 0.3 | 15 | Mixture [1] | 84 |
| HCl | 1.0 | 15 | III | 91 |
| HCl | 3.0 | 15 | III | 65 |
| HCl | 5.0 | 15 | III | 37 |
| H$_2$SO$_4$ | 1.0 | 15 | III | 89 |
| HBr | 1.0 | 15 | III | 93 |
| HOAc | 1.0 | 15 | Mannich base | 66 |
| HCO$_2$H | 1.0 | 15 | ___do___ | 64 |

[1] Mixture of small amount of the desired 4-(-p-chlorophenylthiomethyl)-N-methyl aniline with N-(p-chlorophenylthiomethyl)-N-methyl-2-(p-chlorophenylthio)p-toluidine.

The process of our invention can also be carried out by acid rearrangement of the N-(phenylthiomethyl) anilines (Mannich bases) as shown in the right-hand portion of the general equation above. In this modification of the process, the Mannich bases are prepared by condensing equimolecular proportions of the aromatic thiol with formaldehyde and aromatic amine in a liquid reaction medium such as ethanol (in the absence of strong acid). The resulting N-(phenylthiomethyl) aniline may be isolated if desired and then redispersed in a liquid reaction medium such as ethanol and a substantially equimolecular proportion of strong mineral acid. Or, the N-(phenylthiomethyl) aniline-containing reaction mixture may be mixed with an amount of strong mineral acid molecularly equivalent to the quantity of N-(phenylthiomethyl) aniline present. In either case the reaction mixture is then heated at temperatures of at least about 80° C. preferably between about 80° C. and about 100° C. until rearrangement has taken place to the 4-(phenylthiomethyl) aniline compound, usually between about 15 minutes and about 1 hour.

When the above reaction is carried out by reacting p-chlorothiophenol with formaldehyde and N-methyl aniline in a 1:1:1 mole ratio in the presence of strong acid, there are formed in turn the Mannich base N-(p-chlorophenylthiomethyl), N-methyl aniline then the "rearranged" compound, 4-(p-chlorophenylthiomethyl) - N-methyl aniline of the formula:

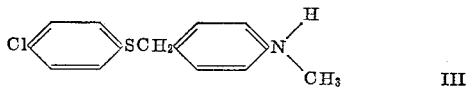

III which is a new composition of matter. It is a crystalline solid having a melting point of 110°–111° C.

Of the compounds which are prepared according to our new process, the new compound 4-(-p-chlorophenylthiomethyl)-N-methyl aniline described above and the compound 4-(phenylthiomethyl) aniline of the formula:

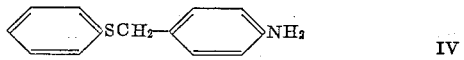

IV have excellent fungicidal activity against fungi and especially against fungus infestations of the character which attack living plants. These two fungicidal compounds can be generically designated by the Formula II above, with the proviso that when R is chlorine, R$^1$ is methyl.

The fungicidal activity exhibited by these two compounds is unpredictable since the compound 4-(p-chlorophenylthiomethyl) aniline, which also can be prepared according to our new process, appears to be devoid of fungicidal activity, although it differs from the new compound only in lacking a methyl group on the nitrogen and differs from 4-(phenylthiomethyl) aniline only in containing a chlorine on the phenyl group attached to the sulfur atom.

A feature of the invention, therefore, relates to a method for retarding and preventing fungus growths on growing plants by application thereto of compositions containing the phenyl thiomethyl aniline compounds as defined. Such application can be made in solutions and/or suspensions thereof in aqueous and organic solvent solutions, and of wettable powder compositions containing such phenyl thiomethyl aniline compound together with other materials forming therewith a powder dispersible in water to give an aqueous composition suitable for spraying on living plants to retard and prevent fungus growth on the plants.

Fungicidal compositions containing the active compounds of the invention are preferably applied to living plants which are infested by or may be subject to attack or infestation by fungi. The plants may be treated by spraying from liquid spray compositions or by spraying or dusting with dusts containing the active ingredients of the invention.

In preparing liquid spray compositions, the solid phenylthiomethyl-aniline compound is dissolved in suitable organic solvents such as acetone, and this solution is dispersed in water. Concentrated solutions of the phenylthiomethyl aniline compound in such water-soluble solvents may be prepared and dispersed in water to give an aqueous spray of suitable concentration for application to plants. In general, the aqueous dispersions which are applied to living plants will contain from about ¼ lb. to about 2 lbs., preferably from about ½ lb. to about 1 lb. of the phenylthiomethyl aniline compound for every 100 gallons of water.

For the preparation of fungicidal dusting compositions, the finely divided phenyl thiomethyl aniline compound is intimately mixed with finely divided dry solid talc, clays such as attapulgite, kaolin or fuller's earth, wood flour or other inert solid carriers of the types commonly employed in formulating fungicidal powder compositions. Wettable powder formulations, suitable for dispersing in water and for applying the water dispersions to plants, are prepared by incorporating in any of these dusting compositions small amounts of ionic surface active materials, for example, about 1% to about 5% by weight which serve to maintain the finely powdered composition dispersed in water with which it is mixed. Suitable surface active materials are the anionic and cationic wetting, dispersing and emulsifying agents commonly used in the preparation of wettable powder compositions, for example, the alkali metal and ammonium salts of long chain aliphatic carboxylic acids, sulfonates of the aromatic or long chain aliphatic hydrocarbons such as sodium alkyl sulfates and sulfonates, alkyl aryl sulfonate salts, sulfonates of glycerides and their fatty acids and sulfonates of derivatives of fatty acid esters. In general we prefer to employ the anionic surface active agents and to formulate the wettable powders containing the phenylthiomethyl aniline compound to include both wetting agent and dispersant or emulsifying agent which is common practice in preparing formulations to be dusted or sprayed onto living plants. In such dusting powders the phenylthiomethyl aniline compound is mixed with for example, 9 to 99 times its own weight of inert diluent, all the ingredients being in finely divided powder form.

The following specific examples further illustrate the new process of our invention and the application to plants and the fungicidal activity of certain of the resulting compounds.

EXAMPLE 1.—PREPARATION OF 4-(PHENYLTHIOMETHYL) ANILINE

*Direct method*

In a 250 ml., three-necked, round-bottom flask, fitted with a mechanical stirrer, reflux condenser and thermometer, were placed 11 grams (0.1 mole) of thiophenol, 50 ml. of 95% ethanol and 7.6 ml. of 37% formalin, equivalent to 0.1 mole of formaldehyde. The mixture was stirred and a solution of 9.3 grams (0.1 mole) of aniline in 8.6 ml. (0.1 mole) of concentrated hydrochloric acid (sp. gr. 1.19) was added. The solution was heated to boiling on a steam bath and refluxed with stirring for 30 minutes. At the end of this time the steam bath was replaced by an ice bath and the mass was cooled to 0° C. whereupon a mass of crystals precipitated. A cold solution of 10% sodium hydroxide was added with stirring until the mixture was strongly basic. The resulting solid 4-(phenylthiomethyl) aniline was collected on a filter, washed with water and twice with cold 95% ethanol. The solid was dried overnight in a vacuum dessicator and yielded 18.6 grams of product equivalent to a yield of 87% the theoretical amount. The crude solid was treated with active carbon and recrystallized twice from 95% ethanol. The recrystallized product had a melting point of 74–75° C.

EXAMPLE 2.—PREPARATION OF 4-(p-CHLOROPHENYLTHIOMETHYL)-N-METHYL ANILINE 2.1 Direct method In a 250 ml., three-necked, round-bottom flask, fitted with mechanical stirrer, a reflux condenser and a thermometer, were placed 28.9 grams (0.2 mole) of p-chlorothiophenol, 15.2 ml. of 37% formalin, equivalent to 0.2 mole of formaldehyde, and 50 ml. of 95% ethanol. The mixture was heated on a steam bath to about 35° C. until all the solids had dissolved. With vigorous stirring a solution of 21.4 grams (0.2 mole) of N-methyl-aniline in 16.2 ml. (0.2 mole) of concentrated hydrochloric acid was added. The reaction mixture thus prepared was refluxed with stirring for 30 minutes. The mixture was then cooled to 0° C., and scratched, whereupon the mixture solidified into a crystalline mass. It was shaken with 10% sodium hydroxide, filtered and washed with three 30 ml. portions of water and one 30 ml. portion of cold ethanol. A yield of 24.5 grams of 4-(chlorophenylthiomethyl)-N-methyl aniline was obtained equivalent to 92.8% of the theoretical amount, which had a melting point of 101–109° C. It was recrystallized twice from ethanol, giving 18.9 grams of product (72% of theoretical) melting at 110°–111° C. An infrared spectrogram of the compound was made which showed the presence of a secondary —NH absorption band at 2.96µ region.

Analysis for $C_{14}H_{14}ClNS$ (246.1 mole wt.)—Found: C, 63.61; H, 5.56. Calculated: C, 63.67; H, 5.35.

2.2 Indirect method

Part A—Preparation of Mannich base.—A mixture was made of one tenth mole of p-chlorothiophenol, 0.1 mole of 37% formalin solution, 0.1 mole of N-methyl aniline and 20 ml. of 95% ethanol in a reaction flask. The flask was heated with stirring at 80° C. for 2 hours. During the heating period, the solution became cloudy and immiscible liquid separated. The reaction mixture was cooled until crystallization occurred and the crystalline N-(p-chlorophenylthiomethyl) N-methyl aniline of the formula:

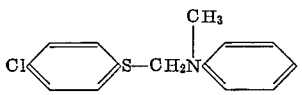

was recovered and recrystallized from ligroin petroleum distillate.

Part B—Rearrangement of N-(p-chlorophenylthiomethyl) N-methyl aniline.—Into a 250 ml., three-necked, round-bottom flask fitted as described in Example 1 above, were placed 13.2 grams (0.05 mole) of N-(p-chlorophenylthiomethyl) N-methyl aniline prepared as described in A above, and 50 ml. of 95% ethanol. The stirrer was started and 4.3 ml. (0.05 mole) of concentrated hydrochloric acid (sp. gr. 1.19) was added dropwise at such a rate as to maintain the reaction temperature below 30° C. When all the acid has been added, the mixture was heated to boiling on a steam bath and refluxed at 80° C. for 30 minutes. The mixture was then cooled on an ice bath and made strongly alkaline with 10% sodium hydroxide solution, whereupon a mass of crystalline solid was precipitated. The solid was collected by suction filtration, washed with water and once with 20 ml. of cold ethanol. The product thus obtained was dried overnight in a vacuum dessicator over $P_2O_5$. The yield of colorless crystals melting at 104–107° C. was 24 grams equivalent to 91% of theoretical. They were recrystallized from ethanol and yielded 19.9 grams (75.2% of theoretical) of 4-(chlorophenylthiomethyl)-N-methyl aniline, which was identified as such by comparison of its melting point, mixed melting point and infrared spectrum with those of a known sample.

EXAMPLES 3 AND 4

One percent acetone solutions of 4-(phenylthiomethyl) aniline (Example 3) and 4-(p-chlorophenylthiomethyl)-N-methyl aniline (Example 4) were prepared and portions thereof were diluted with sufficient water to provide solutions containing 100 parts per million, 10 parts per million and 1 part per million respectively, of the phenylthiomethyl aniline compound. These diluted solutions were tested in standard spore germination tests against spores of *Sclerotinia fructicola* (brown rot of stone fruits). The spores were produced by growing the fungus on potato dextrose agar for one week. The spores were taken up in an 0.5% sodium citrate solution which acts as a stimulant to spore germination. Portions of spore suspension were added to the phenylthiomethyl aniline solutions and the mixtures were placed on slides and incubated for 24 hours at 65° F. Comparable specimens of the spore suspensions in copper sulfate (as a standard fungicide) and tap water with no toxicant were also prepared and incubated for comparative and check purposes respectively. The incubated solutions were then examined for spore germination with the results shown in Table I below.

TABLE I.—PERCENTAGE SCLEROTINIA SPORE GERMINATION AT INDICATED CONCENTRATION OF TOXICANT IN PARTS PER MILLION

| Example No. | Parts per Million | | |
| --- | --- | --- | --- |
|  | 100 | 10 | 1 |
| 3 | 0 | 81 | 91 |
| 4 | 0 | 78 | 95 |
| CuSO$_4$ | 0 | 91 | 97 |
| Check | 97 |  |  |

It will be noted from the table that both phenylthiomethyl aniline compounds exert complete control of the Sclerotinia fungus at dosages of 100 parts per million, and both are superior in their control to the standard copper sulfate fungicide at the lower concentrations of 10 parts and 1 part per million respectively.

EXAMPLES 5 AND 6

One percent acetone solutions of the two phenylthiomethyl aniline toxicants compounds of the invention were diluted with water to provide solutions containing ¼ lb. of toxicant per 100 gallons of water. These solutions were sprayed on the foliage of Mackintosh apple seedlings and allowed to dry on the foliage. The plants were then inoculated with a spore suspension of *Venturia inaequalis* (apple scab), and held in an incubation chamber for 48 hours at 70° F. and approximately 100% humidity. The plants were returned to the greenhouse and held there for 14 days after which they were examined to note percent infected leaf area and spray injury to foliage if any. Comparative test was run with a standard fungicide (Captan) and a check with no toxicant. Results of these tests are shown in Table II below.

TABLE II.—*VENTURIA INAEQUALIS* (APPLE SCAB)

| Example No. | Toxicant | Percent Infected Leaf Area | Spray Injury |
|---|---|---|---|
| 5 | 4-(phenylthiomethyl) aniline | 0 | None. |
| 6 | 4-(p-chlorophenylthio-methyl)-N-methyl aniline. | 13 | Do. |
|  | Captan [1] | 0 | Do. |
| Check | None | 60 | Do. |

[1] N-trichloromethyl mercapto-4-cyclohexene-1, 2-dicarboximide.

It will be noted from the table that 4(phenylthiomethyl) aniline provided complete control of apple scab in the above test with no spray injury and was fully as effective as the standard fungicide (Captan) in this respect. The 4(p-chlorophenylthiomethyl)-N-methyl aniline exhibited substantial control of the apple scab permitting less than ¼ the infection which results with no toxicant, and caused no spray injury.

EXAMPLE 7

A wettable powder was prepared by mixing 25 parts of 4-(phenylthiomethyl) aniline with 71.5 parts of attapulgite clay 1.5 parts of a wetting and dispersing agent (N-methyl-N-oleoyl taurate) and 2.0 parts of sodium lignin sulfonate dispersant, and pulverizing the mixture to obtain a mixture of which 90–95% passed a 325 Tyler mesh screen.

The resulting wettable powder was dispersed in water in the ratio of 2 lbs. per 100 gallons of water. This aqueous dispersion was sprayed on apple seedlings until the foliage was well covered with fine droplets. The spray was allowed to dry and the plants were then inoculated with *Venturia inaequalis* (apple scab fungus) by spraying them with a standard spore suspension. The inoculated seedlings were held in an incubation chamber for 48 hours at 70° F. and about 100% humidity and then placed in a greenhouse until 14 days after the time of inoculation. Apple seedlings were similarly sprayed with a dispersion of 1 lb. per 100 gallons of a 50% wettable powder of the standard fungicide Captan, inoculated, incubated and held in the greenhouse. As a check, apple seedlings were inoculated and similarly treated except for omission of toxicant treatment.

Under the above conditions, complete control of apple scab conditions were obtained in seedlings treated with 4-(phenylthiomethyl) aniline composition which showed no infection whatever with the fungus on the leaves of any of the three seedlings treated, and no injury to the plants. The three plants inoculated with apple scab but not protected by any fungicide showed infection on all plants, 60% of the leaf area being infected.

While the above describes the preferred embodiments of our invention, it will be understood that departures can be made therefrom within the scope of the specification and claims.

We claim:
1. The method of controlling fungi which comprises applying to said fungi a fungicidally effective amount of a 4-phenylthiomethyl aniline of the formula

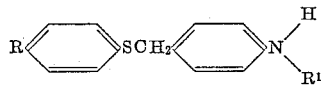

wherein R represents a member selected from the group consisting of hydrogen and chlorine, $R^1$ represents a member of the group consisting of hydrogen and methyl, and wherein, when R is chlorine, $R^1$ is methyl.

2. The process of claim 1 wherein the 4-(phenylthiomethyl) - aniline compound is 4 - (phenylthiomethyl) aniline.

3. The process of claim 1 wherein the phenylthiomethyl aniline compound is 4-(p-chlorophenylthiomethyl)-N-methyl aniline.

4. The method of claim 1 wherein the 4-phenylthiomethyl aniline compound is dispersed in water.

5. The method of claim 1 wherein the 4-phenylthiomethyl aniline is dispersed in an aqueous suspension of a wettable powder.

6. The method of claim 1 wherein the 4-phenylthiomethyl aniline is dispersed in a finely divided inert solid.

References Cited by the Examiner

UNITED STATES PATENTS

| 2,158,648 | 5/1939 | Zerweck | 260—576 |
| 2,642,373 | 6/1953 | Dazzi | 167—30 |
| 2,822,395 | 2/1958 | Dent | 260—576 |
| 2,965,538 | 12/1960 | Weesner | 167—30 |
| 3,166,572 | 1/1965 | Tweit | 167—30 |

FOREIGN PATENTS 758,926  10/1956  Great Britain.

OTHER REFERENCES

Lau et al.: J. Org. Chem., volume 28, No. 10, pages 2763–5, October 1963.

JULIAN S. LEVITT, *Primary Examiner.*

J. D. GOLDBERG, *Assistant Examiner.*